United States Patent [19]
Eder et al.

[11] Patent Number: 5,056,465
[45] Date of Patent: Oct. 15, 1991

[54] CAGE STRUCTURE FOR RESTRAINING PRIMATES

[75] Inventors: Gerald Eder, Rekawinkel; Karl Womastek, Vienna; Josef Rëiländer, Vienna; Walter Simonich, Vienna, all of Austria

[73] Assignee: Immuno Aktiengesellschaft, Vienna, Austria

[21] Appl. No.: 500,192

[22] Filed: Mar. 28, 1990

[30] Foreign Application Priority Data

Apr. 7, 1989 [EP] European Pat. Off. ........ 89890098.0

[51] Int. Cl.$^5$ ............................................. A01K 1/03
[52] U.S. Cl. ................................................... 119/17
[58] Field of Search .................. 119/16, 17, 19, 15, 119/96, 98, 151, 20; 52/106

[56] References Cited

U.S. PATENT DOCUMENTS

| | | | |
|---|---|---|---|
| 2,740,379 | 4/1956 | Collins | 119/20 |
| 3,172,372 | 3/1965 | Schultz | 119/20 |
| 3,399,654 | 9/1968 | Schroer | 119/96 |
| 3,760,768 | 9/1973 | Patterson | 119/17 |
| 4,359,967 | 11/1982 | Cornelson | 119/16 |

FOREIGN PATENT DOCUMENTS

| | | | |
|---|---|---|---|
| 2520654 | 11/1976 | Fed. Rep. of Germany | 119/17 |
| 2716451 | 10/1978 | Fed. Rep. of Germany | 119/96 |
| 2486769 | 1/1982 | France | 119/15 |
| 1512167 | 5/1978 | United Kingdom | 119/17 |

Primary Examiner—Robert P. Swiatek
Assistant Examiner—Todd E. Manahan
Attorney, Agent, or Firm—Burns, Doane, Swecker & Mathis

[57] ABSTRACT

A cage structure for restraining primates includes a bottom of rectangular ground plan and formed by rods or tubes, side walls surrounding the bottom, and a ceiling. A cage structure of this type is to be manufacturable in any desired size and at low an expenditure as possible. The cage develops only low levels of noise. To this end, only one of the side walls, i.e., the front wall, is formed by rods or tubes, while the remaining three side walls and the ceiling are made of concrete or brickwork having their interior surfaces smoothed. The wall opposite the front wall, i.e., the rear wall, is displaceable towards and away from the front wall. At least one side wall and the ceiling incorporate inspection panes made of bullet-proof glass.

15 Claims, 3 Drawing Sheets

CAGE STRUCTURE FOR RESTRAINING PRIMATES

The invention relates to a cage structure for restraining primates, in particular chimpanzees, in biomedical research, comprising a bottom of rectangular ground plan and formed by rods or tubes, side walls surrounding the bottom, and a ceiling.

Known cages of this type for primates are fabricated entirely of special steel or galvanized iron tubes or lattices. They are limited to a maximum size of about 3.5 m² for reasons of construction and production, the dimensions of the tubes or lattices being limited upwardly.

For the purpose of immobilizing a primate for medicinal applications or in order for an animal to change over into a docking cage, one side wall is arranged in a manner displaceable relative to the opposite one, which relative displacement is effected by mechanical means, such as a chain or a threaded spindle, by hand, by an electromotor or by hydraulic means. Hence, the driving means is subject to dirt accumulation by the primate's excreta.

In addition, these known cages have the disadvantage of an intensive noise development due to their being made entirely of metal. Moreover, with lattice cages there is the risk of dirt collecting at the intersections of the rods.

The invention has as its object to provide a cage structure of the initially defined kind, which can be manufactured with dimensions sufficiently large for the primate and at low expenditures and whose noise development, despite its size, is only low, all its mechanical devices being housable in a well protected manner.

In accordance with the invention, this object is achieved in that only one of the side walls, i.e., the front wall, is formed by rods or tubes, while the remaining three side walls and the ceiling are made of concrete or brickwork having their interior surfaces smoothed, in that the wall opposite the front wall, i.e., the rear wall, is displaceable towards and away from the front wall, and in that at least one side wall and the ceiling incorporate insepection panes made of bullet-proof glass.

The walls of concrete or brickwork have the advantage that a private atmosphere is created for the primate, the latter being able to retire to a place that is invisible from the neighboring cage. Besides, the concrete walls may be colored, which is not possible with the known cages exclusively made of metal. Brickwork walls, on their internal sides, may be lined with stainless steel plates or with ground or polished natural or synthetic boards.

The inspection panes, on the one hand, enable the primate to look out of the cage, and on the other hand, allow for (the undisturbed) observation of the primate by a TV camera without disturbing the primate. Moreover, additional lighting may be installed and it is also possible to provide plants to be watched by the primate, which would otherwise not be admitted in biomedicine.

There is also the possibility to cast reception antennas into the concrete walls or brickwork walls in a manner that telemetric data acquisition is feasible from any place. Thereby, the primate may be controlled by night without being disturbed by the watchman's round when asleep.

The rear wall, which is made of concrete or brickwork and, if desired, may comprise an insepection pane, enables the fully protected housing of the driving mechanism for the rear wall, great operational safety thus being reached.

In order to prevent the primate from removing the inspection panes, the interior surface of the inspection panes suitably is flush with the interior surface of the side walls and/or ceiling.

In order to prevent reinfection of the primate by parasites through excreta, the immovable side walls suitably comprise standards supported on the base and including longitudinal consoles at a predetermined distance from the base, which support the bottom and constitute guide rails for the rear wall.

Preferably, the standards and longitudinal consoles are formed in one piece with the side walls, the rear wall suitably being mounted on the longitudinal consoles by means of rollers or wheels.

According to a preferred embodiment, the rollers or wheels are driven, the driving mechanism being arranged on the external side of the rear wall.

The cage according to the invention can be produced in any size without special expenditures. Preferably, the clearance of the cage corresponds to approximately twice the body length of a primate, in particular chimpanzee, and the bottom area of the cage is approximately the square of the double body length.

In order to be able to survey the entire cage well from above, the insepction pane of the ceiling advantageously is provided approximately in the center, its area amounting to about 1/5 of the area of the ceiling.

To quarantee the primate's privacy, the inspection pane of the side wall suitably is disposed eccentrically and above the seating height of a primate.

Advantageously, the area of the inspection panes is 1/15 to 1/10 of that of the respective side wall.

In order to prevent reinfection of the primate by excreta, a cleaning means movable along the bottom suitably is arranged below the longitudinal consoles for cleaning the base. The longitudinal consoles offer a particularly well protected way of arranging the driving mechanism for the cleaning means.

The cleaning means proper, according to a preferred embodiment, comprises a scraper extending transversely over the bottom area of the cage and grazing on the base, which scraper is displaceable from the rear wall to the font wall and back, suitably being articulated to two nuts guided along threaded spindles arranged below the longitudinal consoles and at a distance from the base.

In order to enable the animal keeper to enter the cage for cleaning and care purposes etc., a door lockable and unlockable only from outside is arranged in the rear wall according to a preferred embodiment. The door of the rear wall is designed similar to the door of a bunker, essentially consisting of the material of which the rear wall is made. The inspection pane provided in the rear wall may be arranged in the door.

For the purpose of treating the primate, an oriel-like cage advantageously may be docked to an opening provided in the front wall and closeable by a sliding door.

The invention will be explained in more detail by way of one embodiment and with reference to the accompanying drawing, wherein.

Figure 1:
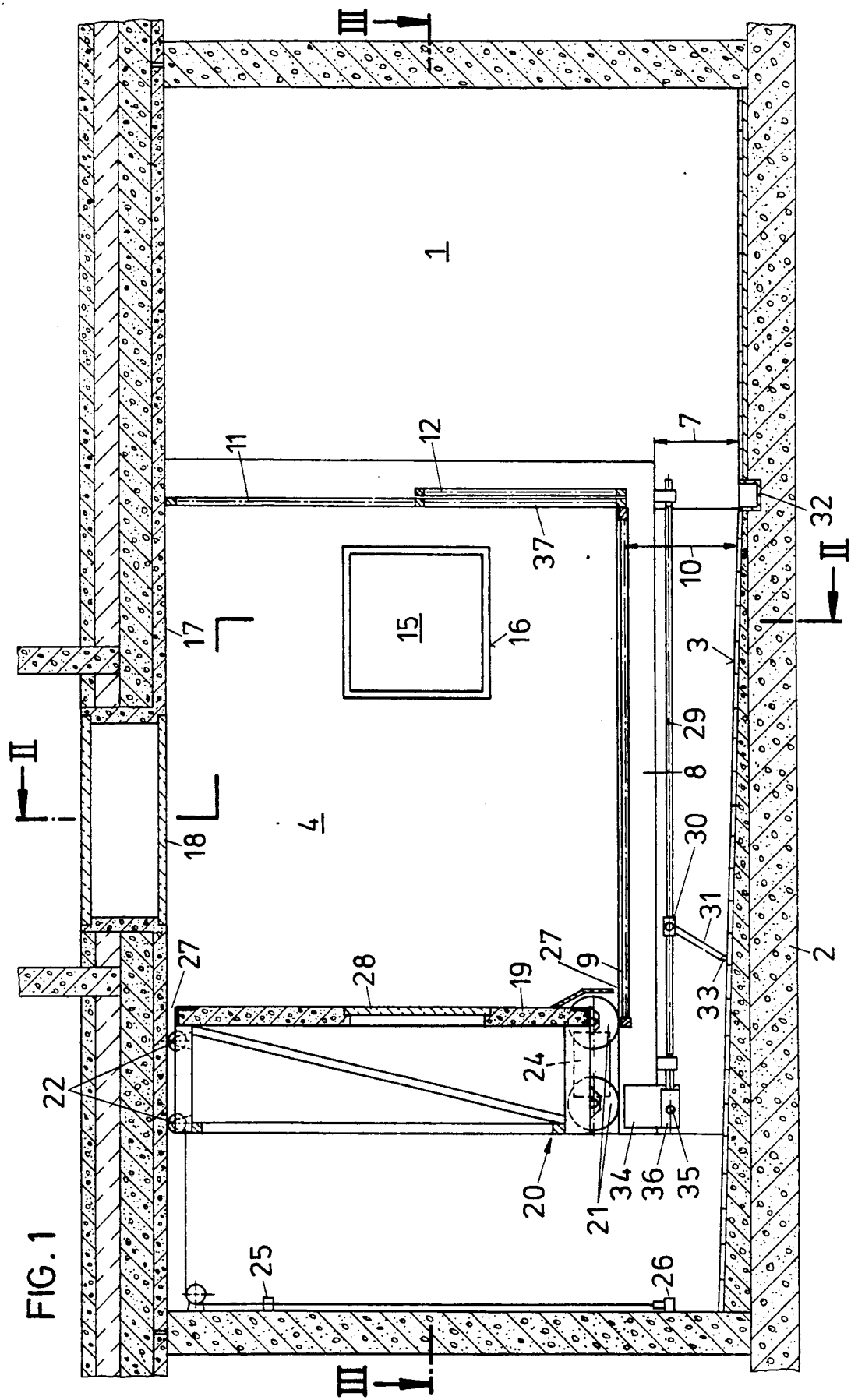
FIG. 1 is a longitudinal section through a cage structure according to the invention.
Figure 2:
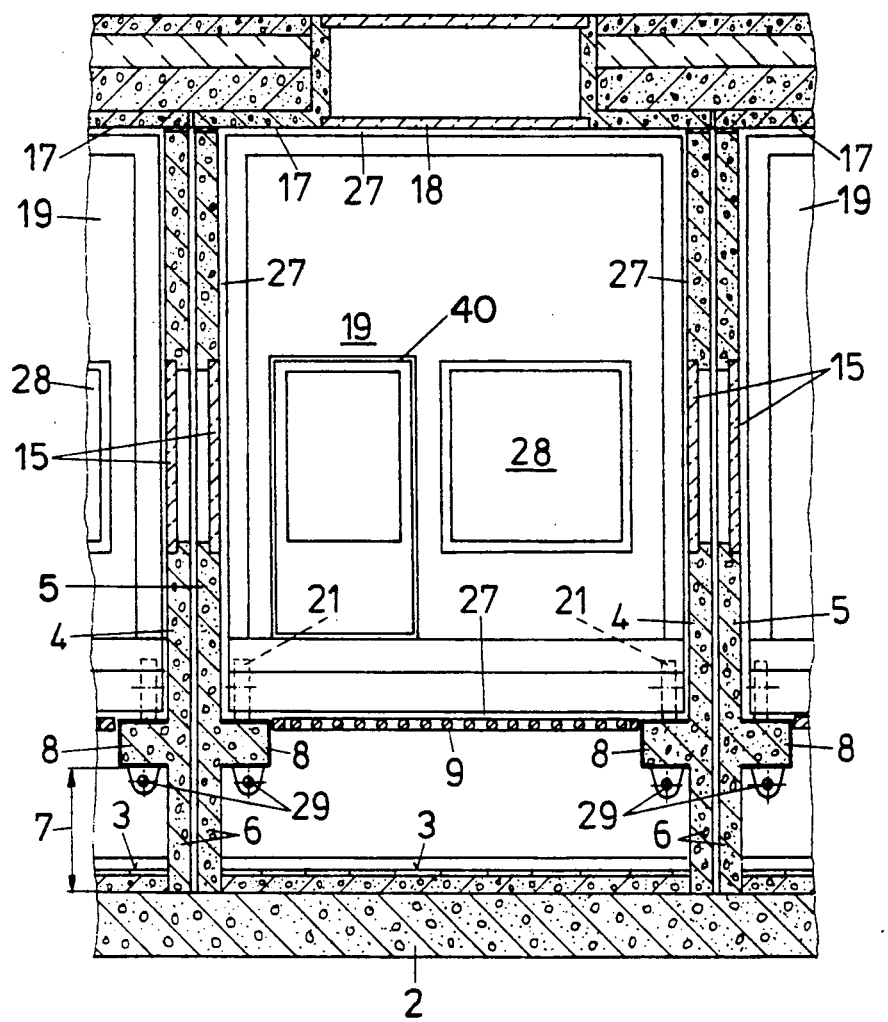
FIG. 2 is a section transverse thereto, along line II—II of FIG. 1.
Figure 3:
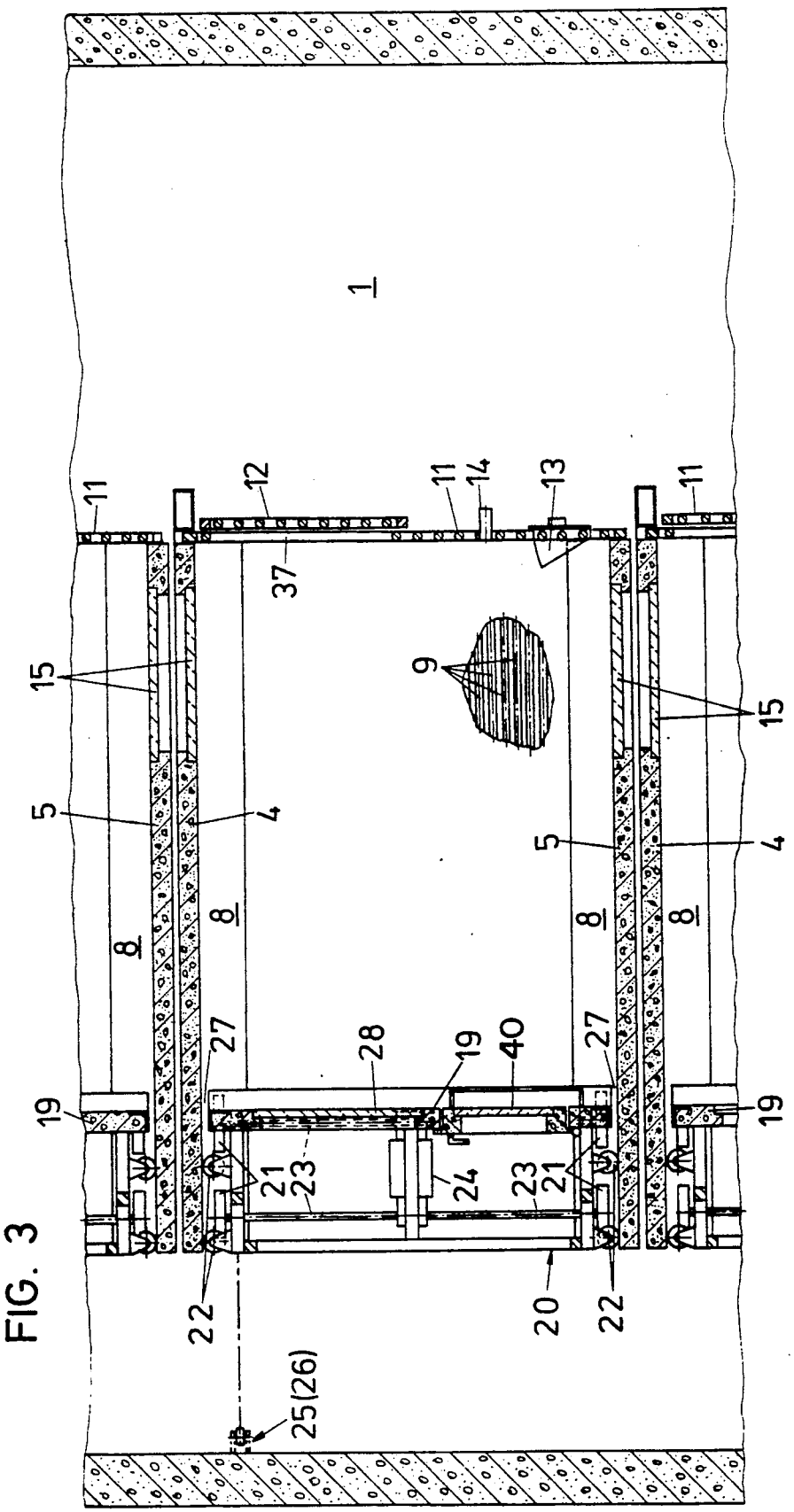
FIG. 3 is a section along line III—III of FIG. 1.

The cage structure is established in a room 1 of a building, several adjacent cages preferably forming a row of cages, which extends in the longitudinal direction of the room 1. Below the cages, the base bottom 2 of the room 1 has a surface 3 inclined by about 3, thus considerably facilitating cleaning as will be explained in more detail below.

Every cage is rectangular in ground plan, two neighboring cages abutting each other by their longitudinal side walls 4, 5. The longitudinal side walls 4, 5 of the cage are formed by concrete walls each resting on the base bottom 2 by standards 6 and including longitudinal consoles 8 extending horizontally and projecting into the cage interior, at a predetermined distance 7 above the base bottom 2. The standards 6, the longitudinal consoles 8 and the longitudinal side walls 4 and 5 are integrally made of concrete. On the longitudinal consoles 8, there rests a cage bottom 9 formed by rods or tubes of antirust metal welded into a sectional-tube frame and screwed with the longitudinal consoles 8. The height 10 of the bottom 9 above the inclined surface 3 ois about 70 cm (as an average).

The front wall 11 of the cage likewise is formed by rods or tubes of qantirust material welded into a sectional-tube frame fastened to the longitudinal side walls 4, 5. It includes a vertical barred sliding door 12, which is fixable in its upper and lower positions and, for an easier displacement, is provided with a weight counterbalance (not illustrated) formed by a cable hoist guided over deflection pulleys and by a counterweight.

On the front wall 11, a pivotable fodder container 13, which can be locked in its two extreme positions, as well as a retaining means 14 for a water bottle are arranged. In addition, an automateic feeder for creative feeding, such as, e.g., a popcorn automat, for self-service may be provided. Even various games of skill or a joy stick may be provided there, by which the animal, in a creative manner, may choose on its own the intensity and color of lighting, a radio program or the volume thereof.

The longitudinal side walls 4, 5 comprise inspection panes 15 of bullet-proof glass, whose interior surfaces terminate in a flush manner with the interior surface of the concrete. The lower rims 16 of the inspection panes are located approximately 70 cm above the bottom 9 of the cage. The size of the inspection panes is about half a square meter.

The ceiling 17 of the cage structure is manufactured of concrete, also including an inspection pane 18 of bullet-proof glass. This inspection pane 18 is located approximately in the center of the ceiling 17 and is about 1 square meter in size. It enables the observation of nearly the entire cage interior.

The rear wall 19 arranged opposite the front wall and also made of concrete is arranged on a carriage 20, which is displaceable along the longitudianl consoles 8 by wheels or rollers 21. The carriage 20, which is a steel construction, comprises guiding rollers 22 supported on the ceiling 17 and on the longitudinal side walls 4, 5 to prevent the rear wall 19 from canting. The rubber-tired rollers 21 of the carriage, which rest on the longitudinal consoles, are coupled to a drive and gearing 24 by means of axles 23 such that the rear wall 19 is movable towards the front wall 11 and back at a low speed. A door(40) is provided in the rear wall (19).

End switches 25, 26 adjustable in accordance with the primate's size serve to limit the course of displacement of the rear wall relative to the longitudinal side walls 4, 5, the bottom 9 and the ceiling 17.

In order to safely prevent the primate from being hurt during the immobilization procedure, the upper third of the front wall 11 is movable obliquely backwards via a joint not illustrated in the drawing. A rake-like multipronged drift means arranged on the front wall 11 may serve the same purpose.

For behavioral studies, an approximately 70×70 cm inspection pane 28 of bullet-proof glass is mounted in the rear wall, behind which either a TV camera or a TV monitor may be installed. The scanning rate on the monitor can be controlled. Controlling of the scanning rate or of the pictures presented is effected from a control room beyond the infectious zone.

All the walls manufactured of concrete, on their interior surfaces, are completely smooth so that damage by the primate is not feasible. The rear wall 19 has frames of stainless steel.

Below the longitudinal consoles 8 of the longitudinal side walls 4, 5, threaded spindles 29 extend longitudinally, on which a cleaning scraper 31 for solid waste mounted by nuts 30 and a spraying nozzle unit (not illustrated) for washing off small waste particles and excreta are displaceable towards a trench 32 arranged on the level of the front wall 11 of the cage, and back. The scaper 31 carries a rubber lip 33 on its edge contacting the inclined surface 3. The threaded spindles 29 are driven by a drive motor 34, driving shafts 35, clutches and an angular gear 36. End switches effect the limitation of the course of the scaper 31.

The spraying nozzle unit is operated simultaneously with the scraper 31, thus constituting a great relief to the caretakers.

The cage may be designed in various ways. It is, for instance, possible to mount a multi-step steel ladder of welded seamless special-steel tubes to the rear wall. Between the front and the rear walls, two hemp ropes may be stretched by means of carbines so as to form a hammock with the help of a jute sack. In this manner, the usual nest that primates would make on trees in the wilderness is imitated.

The cage for a chimpanzee represented in the exemplary embodiment illustrated has a height of about 2.30 m, a length of about 2.60 m and a width of about 2 m.

The invention is not limited to the exemplary embodiment illustrated, but may be modified in various aspects. It is, for instance, possible to displace the rear wall along the consoles and to provide any other driving mechanisms for the rear wall and for the scraper.

For the treatment of the primate, it is advantageous if an oriel-type docking cage is adapted to be coupled to the opening 37 to be closed by the barred sliding door 12 of the front wall 11, which cage, too, is provided with a sliding door. Upon coupling and opening of the two sliding doors and forward displacement of the rear wall, the animal changes over into the docking cage and is more easily accessible in the relatively small docking cage.

If several cage structures according to the invention are adjacently arranged with the immovable side walls 4, 5 coming to abut each other, it is possible to omit the inspection panes 15 provided in the immediately adjacent side walls 4, 5, or to arrange them so as to be removable and re-installable, thus forming a large cage for several animals, the animals being allowed to change from one cage to another through the openings formed by omitting the inspection panes 15.

It is also possible to produce two immediately neighboring side walls 4, 5 in one piece, the interior surfaces optionally having to be ground in order to get the desired smoothness if manufactured of concrete.

The immovable side walls, the rear wall and the ceiling also may be made of epoxy concrete. Moreover, it is possible to build these walls even of brickwork, for instance, to provide shell-type bricks to be cast with concrete. To the internal side of a side wall formed by brickwork, a revetment of synthetic or natural stone, e.g. granite or marble, may be applied, the surfaces suitably being abraded or polished. A stainless steel sheeting may also be provided instead of the synthetic or natural stone revetment.

In accordance with the invention, the term inspection panes of bullet-proof glass also covers inspection panes of other materials, such as synthetics, provided that they exhibit the required qualities, such as, in particular, security against fracture and resistance against deformation.

What we claim is:

1. In a cage structure for restraining primates, such as chimpanzees in biomedical research, of the type including a bottom of rectangular ground plan formed by rods or tubes, side wall means surrounding said bottom, and a ceiling, the improvement wherein said side wall means comprise immovable side walls, a front wall, and a rear wall arranged opposite said front wall and movable towards and away from said front wall; said front wall being composed of rods or tubes and said side walls and said rear wall being made of concrete or brickwork and having their interior surfaces smoothed; and wherein at least one of said side wall means and said ceiling incorporates inspection panes made of bullet-proof glass.

2. A cage structure as set forth in claim 1, wherein said inspection panes have interior surfaces flush with said interior surfaces of said at least one of said side wall means and said ceiling.

3. A cage structure as set forth in claim 1, further comprising a base, standards provided on said immovable side walls and supported on said base, and longitudinal consoles provided on said standards at a predetermined distance from said base to support said bottom, said longitudinal consoles forming guiding rails for said rear wall.

4. A cage structure as set forth in claim 3, wherein said standards and said longitudinal consoles are formed in one piece with said immovable side walls.

5. A cage structure as set forth in claim 3, further comprising rollers or wheels for mounting said rear wall on said longitudinal consoles.

6. A cage structure as set forth in claim 5, further comprising a driving mechanism arranged on the external side of said rear wall for driving said rollers or wheels.

7. A cage structure as set forth in claim 3, further comprising a cleaning means arranged below said longitudinal consoles in a manner movable along said bottom and adapted to clean said base.

8. A cage structure as set forth in claim 7, wherein said cleaning means comprises a scraper extending transverse to the bottom of said cage and grazing on said base, said scraper being displaceable from said rear wall to said front wall and back.

9. A cage structure as set forth in claim 8, further comprising threaded-spindle means arranged below said longitudinal consoles at a distance from said base and two nuts guided along said threaded-spindle means, said scraper being hinged to said two nuts.

10. A cage structure as set forth in claim 1, wherein said cage structure has a clear height approximately corresponding to twice the body length of a primate and a bottom area corresponding approximately to the square of twice the body length of said primate.

11. A cage structure as set forth in claim 1, wherein said ceiling has an inspection pane disposed approximately in its center, said inspection pane having an area amounting to about 1/5 of the area of said ceiling.

12. A cage structure as set forth in claim 1, wherein said side wall means has an inspection pane disposed eccentrically and above a seating height of a primate.

13. A cage structure as set forth in claim 1, wherein said side walls and said rear wall have insepction panes having areas amounting to about 1/15 to 1/10 of the respective one of said side and rear walls.

14. A cage structure as set forth in claim 1, further comprising a door provided in said rear wall and adapted to be locked and unlocked only from outside.

15. A cage structure as set forth in claim 1, wherein said front wall includes an opening and a sliding door is provided for closing said opening, and wherein an oriel-type cage structure is adapted to be docked to said cage structure via said opening.

* * * * *